United States Patent Office 2,880,245
Patented Mar. 31, 1959

2,880,245

PROCESS FOR PRODUCING γ-DINITROALKANES FROM PRIMARY NITROALKANES

Gustave Bryant Bachman, West Lafayette, Ind., and Mark Trevor Atwood, Ponca City, Okla., assignors to Purdue Research Foundation, Lafayette, Ind., a corporation of Indiana No Drawing. Application June 21, 1955
Serial No. 517,076

8 Claims. (Cl. 260—644)

Our invention relates to the production of γ-dinitroalkanes and more particularly it relates to the production of γ-dinitroalkanes from primary nitroalkanes and formaldehyde.

The γ-dinitroalkanes of this invention are polynitro compounds in which the nitro groups are in the gamma position with respect to each other, that is, the nitro groups are attached to carbon atoms which are separated from each other by a single additional carbon atom. Previously known methods for the production of γ-dinitroalkanes includes reaction of a salt of a nitroalkane with a nitroolefin to produce the dinitroalkane in salt form as described in U.S. Patent 2,477,162, issued July 26, 1949, to Carl T. Bahner and Harvey T. Kite; condensation of nitromethane with certain ketones as described in U.S. Patent 2,383,603, issued August 28, 1945, to M. S. Larrison and H. B. Hass. These processes and others require the use of special materials such as nitroolefins, Mannich bases of nitroalkanes, etc. or the processes are limited in their application as, for example, the above-mentioned Larrison and Hass process which applies only to nitromethane.

We have now discovered a new process for the production of γ-dinitroalkanes which employs readily available starting materials and which is of wide application in the production of many different γ-dinitroalkanes. Our new process consists essentially of condensing a primary nitroalkane containing at least two carbon atoms with formaldehyde in the presence of a base. Thus, for example, two moles of nitroethane react with one mole of formaldehyde to produce 2,4-dinitropentane. In the same manner, other products of our new process include 3,5-dinitroheptane, 4,6-dinitrononane, 2,8-dimethyl - 4,6 - dinitrononane, 7,9-dinitropentadecane, etc. The products of our new process have two centers of asymmetry and therefore exist in two diastereomeric forms which can be separated by fractional crystallization.

As indicated above, we employ a primary nitroalkane as one starting material in our new process which primary nitroalkane contains at least two carbon atoms. Suitable primary nitroalkanes include nitroethane, 1-nitropropane, 1-nitrobutane, 1-nitropentane, etc. We condense the primary nitroalkane containing at least two carbon atoms with formaldehyde or a formaldehyde polymer, such as paraformaldehyde, in the presence of a basic catalyst. Suitable bases include primary, secondary, and tertiary amines, heterocyclic secondary and tertiary amines as well as inorganic basic materials. Specific bases which can be used in our new process include n-butylamine, diethylamine, dibutylamine, triethylamine, piperidine, sodium carbonate, etc.

Our new process is preferably carried out under condition of elevated temperature, since under such condition, the condensation proceeds at a more rapid rate. In carrying out our reaction, we prefer to mix the reactants and then to heat the mixture to reflux the same at a temperature generally ranging between about 90 and 120° C. We also prefer to employ an excess of the nitroalkane in the reaction, the theoretical proportion being two moles of primary nitroalkane to 1 mole of formaldehyde. The basic catalyst is employed in catalytic amounts, i.e. amounts on the order of about 0.05 mole.

Following the condensation of the primary nitroalkane with the formaldehyde, the reaction mixture is cooled and neutralized, the unreacted starting materials and water being then removed. In the case of the lower boiling γ-dinitroalkanes, the residue remaining after removal of water and unreacted starting materials is steam distilled and the product isolated from the steam distillate by vacuum distillation and recrystallization from ether at low temperature. The higher boiling γ-dinitroalkanes are isolated from the residue left after removal of water and unreacted starting materials by cooling and filtration.

The following examples are offered to illustrate our invention, but we do not intend to be limited to the particular procedure, materials, or conditions mentioned therein. Rather, we intend to include within the scope of this invention as defined in this specification and the attached claims all equivalents obvious to those skilled in the art.

Example I

Into a 500-ml. 3-neck flask equipped with magnetic stirrer, thermometer well and condensor, were placed 179 ml. of nitroethane (2.5 moles), 31 grams of paraformaldehyde and 5 ml. of diethylamine. The mixture was refluxed at 98–112° C. for 2.5 hours and was then neutralized with acetic anhydride. The product mixture was steam distilled, and the steam distillate extracted with ether. The ether extracts were combined and dried, the ether then distilled off and the residue fractionally distilled. The higher boiling fractions were mixed, added to an equal volume of ether, and then cooled to crystallize 2,4-dinitropentane which was recrystallized twice from ether and dried in a vacuum over phosphorus pentoxide. Melting point 43.0–0.43.5° C. Analysis—Calculated: N=17.28. Found: N=17.37.

Example II

In the same apparatus as described in Example I, 268 ml. of 1-nitropropane, 10 grams of paraformaldehyde, and 5 ml. of diethylamine were refluxed at 90–110° C. for three hours. During this time, two additional 10-gram portions of formaldehyde were added and after 1.5 hours of heating a second 5-ml. portion of diethylamine was added. The reaction mixture was cooled and neutralized with acetic anhydride and then water and excess 1-nitropropane were removed under vacuum. The residue was cooled for 24 hours after which 22 grams of solid material were removed by filtration. The filtrate was distilled under vacuum to precipitate a further solid material which was added to the 22 grams of solid material previously filtered out, the resulting mixture dissolved in an equal volume of ether and the ether solution then cooled to crystallize 3,5-dinitroheptane. Melting point, 27–30° C.

Example III

The experiment described in Example II was repeated except that piperidine was employed in the place of diethylamine. The product 3,5-dinitroheptane was obtained as a white, crystalline solid.

Example IV

The process as described in Example II was repeated except that triethylamine was used in place of diethylamine. The product 3,5-dinitroheptane was obtained as a white, crystalline solid.

Example V

In a 1,000-ml. 3-neck flask equipped with stirrer, thermometer well, and condenser, were placed 225 ml. of 1-nitropropane, 31 grams of paraformaldehyde, 5.3 grams of sodium carbonate, and 200 ml. of 95% ethanol. The mixture was refluxed for 27 hours with stirring and then cooled and extracted with a large amount of water and then with dilute hydrochloric acid. The organic residue was steam distilled, the steam distilled extracted with ether and the ether extract collected and dried. The dry ether solution was then distilled under vacuum and the last fraction added to an equal volume of ether and cooled overnight to precipitate 3,5-dinitroheptane as a white, crystalline solid.

Example VI

In a 200-ml. round bottom flask were placed 0.5 mole of 3-methyl-1-nitrobutane, 0.25 mole of paraformaldehyde, 0.02 mole of diethylamine and 22 ml. of benzene. A water trap and condenser were attached and the mixture refluxed for 7.5 hours resulting in the elimination of 0.2 mole of water. A portion of the product mixture was extracted with dilute hydrochloric acid and with distilled water. During the extraction, a solid separated. The solid was filtered from the solution and washed twice with petroleum ether and then dried over phosphorus pentoxide. A portion of the material was recrystallized twice and then thoroughly dried. Melting point 121° C. Analysis—Calculated for 2,8-dimethyl-4,6-dinitrononane: N=11.37. Found: N=11.29. The remainder of the product mixture was heated gently under vacuum to remove benzene and unreacted 3-methyl-1-nitrobutane. The residual liquid was then evaporated and cooled to give a white solid which on recrystallization from aqueous ethanol gave light yellow crystals as a first crop. The light yellow crystals were recrystallized twice from ethanol and dried in a vacuum over phosphorus pentoxide. Melting point 57–58° C. Analysis—Calculated for 2,8-dimethyl-4,6-dinitrononane: N=11.37. Found: N=11.29. This material was a diastereomer of the material melting at 121° C.

Example VII

In the same apparatus described in the previous example, were placed 0.5 mole of 1-nitroheptane, 0.25 mole of paraformaldehyde, 0.07 mole of diethylamine, and 45 ml. of benzene. The reaction mixture was refluxed for 11 hours during which period 0.25 mole of water was removed. Following the reaction, the mixture was cooled and then vacuum distilled to remove the benzene. The residue was cooled and a precipitate formed which was removed by filtration. The filtrate was distilled under vacuum to remove unreacted 1-nitroheptane and the residue of this distillation cooled and the resulting precipitate removed by filtration. The precipitates were collected and recrystallized from 95% ethanol to obtain two crystalline products. The first, the less soluble in ethanol existed as large, thin white plates. Analysis—Calculated for 7,9-dinitropentadecane: N=9.26. Found: N=9.28. Melting point, 70–71° C. The second crystalline product, the more soluble in ethanol, existed as very small, cubic, white crystals. Melting point 44.5–45° C. Analysis—Calculated for 7,9-dinitropentadecane: N=9.26. Found: 9.49. The two products were diastereomers of 7,9-dinitropentadecane.

In separate small flasks were placed 0.06 g. of the diastereomer of 7,9-dinitropentadecane melting at 44.5–45° C. and 0.06 g. of the diastereomer melting at 70–71° C. To each flask was then added 10 ml. methanol and 1 drop of n-butylamine and the solutions allowed to stand overnight. Each solution was then acidified with hydrochloric acid and then to each small amounts of water were added periodically with cooling to obtain 3 crops of crystals from each flask. The first crop from the flask originally containing the diastereomer melting at 44.5–45° C. had a melting point of 68–69° C., the second crop melted at 43° C. and the third crop at 42.5–43° C. indicating interconversion of the diastereomers. The first crop from the flask originally containing the diastereomer melting at 70–71° C. had a melting point of 68–70° C., the second crop melted at 43° C. and the third crop at 42–43° C. further indicating interconversion of the diastereomers.

Now having described our invention, what we claim is:

1. A process for the production of γ-dinitroalkane which comprises condensing a primary nitroalkane containing at least two carbon atoms with formaldehyde in a molar ratio of at least 2 to 1 respectively in the presence of a basic agent serving as a condensation catalyst.

2. A process for the production of γ-dinitroalkane which comprises condensing a primary nitroalkane containing at least two carbon atoms with formaldehyde in a molar ratio of at least 2 to 1 respectively in the presence of a catalytic amount of an amine serving as a condensation catalyst.

3. A process for the production of γ-dinitroalkane which comprises condensing a primary nitroalkane containing at least two carbon atoms with formaldehyde in a molar ratio of at least 2 to 1 respectively in the presence of a catalytic amount of an amine selected from the group consisting of primary, secondary, and tertiary aliphatic amines and heterocyclic secondary and tertiary amines serving as condensation catalysts.

4. A process for the production of 2,4-dinitropentane which comprises condensing at least two moles of nitroethane with one mole of formaldehyde in the presence of catalytic amounts of a base serving as a condensation catalyst.

5. A process for the production of 3,5-dinitroheptane which comprises condensing at least two moles of 1-nitropropane with one mole of formaldehyde in the presence of a catalytic amount of a base serving as a condensation catalyst.

6. The process of claim 5 wherein the basic catalyst is diethylamine.

7. The process of claim 5 wherein the basic catalyst is sodium carbonate.

8. The process of claim 5 wherein the basic catalyst is piperidine.

References Cited in the file of this patent

UNITED STATES PATENTS

| | | |
|---|---|---|
| 2,132,330 | Vanderbilt | Oct. 4, 1938 |
| 2,135,444 | Vanderbilt | Nov. 1, 1938 |
| 2,231,403 | Wyler | Feb. 11, 1941 |

OTHER REFERENCES

Heim: Berichte, 44, pp. 2016–22 (1911).